US006799049B1

(12) United States Patent
Zellner et al.

(10) Patent No.: US 6,799,049 B1
(45) Date of Patent: Sep. 28, 2004

(54) SYSTEM AND METHOD FOR TRACKING MOVEMENT OF A WIRELESS DEVICE

(75) Inventors: Samuel N. Zellner, Dunwoody, GA (US); Mark J. Enzmann, Roswell, GA (US); Robert T. Moton, Jr., Alaphetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 643 days.

(21) Appl. No.: 09/739,339

(22) Filed: Dec. 19, 2000

(51) Int. Cl.[7] ................................................. H04Q 7/20
(52) U.S. Cl. ................................ 455/456.1; 455/456.6; 455/404.2
(58) Field of Search ........................... 455/404.1, 404.2, 455/456.1, 456.2, 456.5, 456.6, 457, 550.1, 556.1; 701/213, 214

(56) References Cited

U.S. PATENT DOCUMENTS

| | | | |
|---|---|---|---|
| 5,663,734 A | | 9/1997 | Krasner |
| 5,918,180 A | * | 6/1999 | Dimino ................... 455/456.3 |
| 5,960,341 A | * | 9/1999 | LeBlanc et al. ......... 455/426.1 |
| 5,973,643 A | * | 10/1999 | Hawkes et al. ............. 342/457 |
| 6,356,841 B1 | * | 3/2002 | Hamrick et al. ............ 701/213 |
| 6,362,778 B2 | * | 3/2002 | Neher ................... 342/357.07 |
| 6,421,009 B2 | * | 7/2002 | Suprunov ................... 342/465 |
| 6,438,393 B1 | * | 8/2002 | Suuronen ................. 455/575.1 |
| 6,522,265 B1 | * | 2/2003 | Hillman et al. ............. 340/988 |
| 6,542,823 B2 | * | 4/2003 | Garin et al. ................ 701/213 |
| 6,650,902 B1 | * | 11/2003 | Richton ................... 455/456.3 |

OTHER PUBLICATIONS

"Wireless Application Protocol", Oct. 1999 Wireless Internet Today, pp. 1–20.
Mark Moeglein, et al., "An Introduction to Snap Track Server–Aided GPS Technology", available at http://www.snaptrack.com/atwork.html.

"Signal Soft Wireless Location Services" available at http://www.signalsoftcorp.com/products/location_manager.html.

U.S. patent application Ser. No. 09/739,162.
U.S. patent application Ser. No. 09/739,340.
U.S. patent application Ser. No. 09/606,535.
U.S. patent application Ser. No. 09/606,534.
U.S. patent application Ser. No. 09/630,134.
U.S. patent application Ser. No. 09/739,315.

* cited by examiner

*Primary Examiner*—Erika Gary
*Assistant Examiner*—Tamica M. Davis
(74) *Attorney, Agent, or Firm*—Cantor Colburn LLP

(57) ABSTRACT

The present invention is a system and method for tracking movement of a wireless device. The tracking can be done during a wireless communication session between the wireless device and a called party. The present invention comprises a location system that can generate initial location information pinpointing an initial location of the wireless device. The location system can generate subsequent location information pinpointing subsequent locations of the wireless device. The system further comprises a location server that can determine whether the subsequent location information should be provided to the called party in accordance with a rule. Based on the subsequent location information, the movement of the wireless device can be tracked by the called party. In the preferred embodiment, the wireless device is a wireless telephone and the called party is a public safety answering point. In the preferred embodiment, the subsequent location can be generated at regular intervals, and the subsequent location can be provided to the public safety answering point when the subsequent location information indicates that the wireless device has traveled a specific distance.

37 Claims, 5 Drawing Sheets

SYSTEM AND METHOD FOR TRACKING MOVEMENT OF A WIRELESS DEVICE

BACKGROUND

1. Field of the Invention

The present invention relates to telecommunication systems, and in particular, to a system and method for tracking the movement of a wireless device.

2. Background of the Invention

The use of wireless devices is increasing at a rapid rate. A majority of the people living in large metropolitan areas use one or more wireless devices on a daily basis. These people communicate with each other or access information on the Internet using, among other devices, wireless telephones, interactive pagers, personal digital assistants, and handheld computers. As technology continues to improve, wireless devices will become more useful; at the same time, they will decrease in size and weight, making them more portable than ever. Consequently, consumers may carry their wireless devices wherever they go. For some people, their wireless device will become indispensable.

The widespread use of the wireless telephones in the United States has prompted the Federal Communications Commission (FCC) to promulgate new rules related to emergency call processing. The FCC's wireless Enhanced 911 (E911) rules require certain Commercial Mobile Radio Services (CMRS) carriers to begin transmission of enhanced location and identity information in two phases. The first phase, started on Apr. 1, 1998, required wireless service providers to transmit a 911 caller's number and section of the cell site from which the call is originated to a public safety answering point (PSAP). The second phase, starting on Oct. 31, 2001, requires all wireless service providers to locate two-thirds of all 911 callers within 125 meters of their physical locations. In other words, for all 911 calls received, a PSAP must be able to pinpoint 67% of the callers within 125 meters.

Under the FCC rules, wireless communication networks and wireless telephones (or any wireless devices that can be used to call 911), must provide both the identity and location of the caller to a 911 dispatcher. To provide a caller's identity, the wireless device will furnish a device identification, e.g., a mobile identification number (MIN), indicating in most instances the telephone number of the device. To provide a caller's location, the wireless communication networks and wireless devices will use a network-based location system or a handheld location system installed within the wireless devices, or a combination of the two systems. An example of a handheld location system is a Global Positioning System (GPS) receiver. U.S. Pat. No. 5,663,734, which is incorporated herein by reference, discloses a GPS receiver and a method for processing GPS signals.

The existing and contemplated E911 technologies have a number of limitations. For example, the existing technology does not provide continuous location information. Using the existing technology, a PSAP that receives an E911 call reporting an emergency situation knows only the initial location of the caller at the time the 911 call was made. As a result, once the caller and the wireless device is moved to a subsequent location substantially away from the initial location, the PSAP information is outdated, and may even be useless. For example, if an emergency response team is dispatched to the initial location, and the caller had been moved to the subsequent location that is miles away from the initial location, the emergency response team would not be able to respond to the emergency. This is especially true if the wireless device is located in a fast-moving vehicle traveling in a complex highway system. Thus, for example, the existing technology is inadequate to provide meaningful assistance to 911 callers under the following exemplary circumstances: (1) a kidnapped victim who is being transported in the trunk of a car; (2) a hijacked bus driver who is unable to speak due to duress from the hijackers; and (3) an out-of-towner who is being chased by criminals in an area having landmarks that are unfamiliar to the out-of-towner.

FIG. 1 is a schematic diagram showing prior art wireless communication network 10 having a plurality of cell sites within which wireless telephone 110 travels. Base stations 121, 131, and 141 are located within cell sites 120, 130, and 140, respectively. While base stations 121, 131, and 141 are stationary, wireless device 110 is mobile. When wireless device 110 establishes a 911 call with PSAP 150 via MSC (mobile service center) 160 while wireless device 110 is located within cell site 120, a location system of wireless communication network 10 generates initial location information pinpointing wireless device 110 to be at a first location within cell site 120. If wireless device 110 is subsequently moved, e.g., to a second location in cell site 130 or a third location in cell site 140 during the wireless communication session, the existing location system does not generate subsequent location information for PSAP 150. Therefore, PSAP 150 has only the initial location information that an emergency response team could use to assist the user of wireless device 110. However, if the user and wireless device 110 are at either the second location or the third location, each of which is miles away from the first location, then dispatching the emergency response team to the first location is of little use.

SUMMARY OF THE INVENTION

The present invention is a system and method for tracking the movement of a wireless device. The present invention comprises a location system that can generate location information pinpointing the wireless device's location. In preferred embodiments of the present invention, the location information can comprise point coordinates. The location system can be a network-based component or it can be a handheld unit integrated in the wireless device. A network-based location system can generate the location information using a plurality of methods. In an exemplary embodiment of the present invention, the network-based location system can generate the location information using triangulation across cell sites. An example of a handheld location system is a GPS receiver that is in communication with a constellation of GPS satellites. In preferred embodiments, both network-based and handheld location systems can provide redundancy, reliability, and increased accuracy.

The present invention further comprises a location server that can receive and process the location information. The location server comprises a memory, as an integral or separate component, for storing data that includes, among other things, the location information and identity information of the wireless device. In preferred embodiments, the identity information comprises a unique identification number of the wireless device. For example, the mobile identification number (MIN) of a wireless telephone could be used as the identity information. For other wireless devices, each device's serial number or other unique attributes may be used as the identity information.

An embodiment of the present invention can enable a called party, such as a PSAP, to track the movement of a wireless telephone during a wireless communication session. In other words, by using the present invention, the PSAP can know the location of the wireless device at all times during the wireless communication session. In another embodiment, the called party may be a private entity that can receive the location information of the wireless device to accomplish one or more of actions.

A method for using the present invention can comprise the following steps. First, a wireless communication session can be established between the wireless device and the called party. The communication session may be a POTS (plain old telephone system) call or a voice-over-Internet Protocol (VoIP) call. Second, the location system can generate and provide initial location information to the called party. Subsequent location information may be generated by the location system based on rules. The rules may comprise generating the location information continuously, at regular intervals, or based on other criteria. Third, the location information can be used to performed an action. The action may be, for example, tracking or otherwise observe the movement of the wireless device during the wireless communication session. In some embodiments, the method can further comprise the step of using the location information to perform another action after the wireless communication session is terminated.

Accordingly, it is an object of the present invention to enable the called party to track the movement of the wireless device during the wireless communication session.

It is another object of the present invention to enable the called party to perform one or more actions using the location information after the wireless communication session is terminated.

These and other objects of the present invention are described in greater detail in the detailed description of the invention, the appended drawings, and the attached claims.

DETAILED DESCRIPTION OF THE INVENTION

Figure 1:
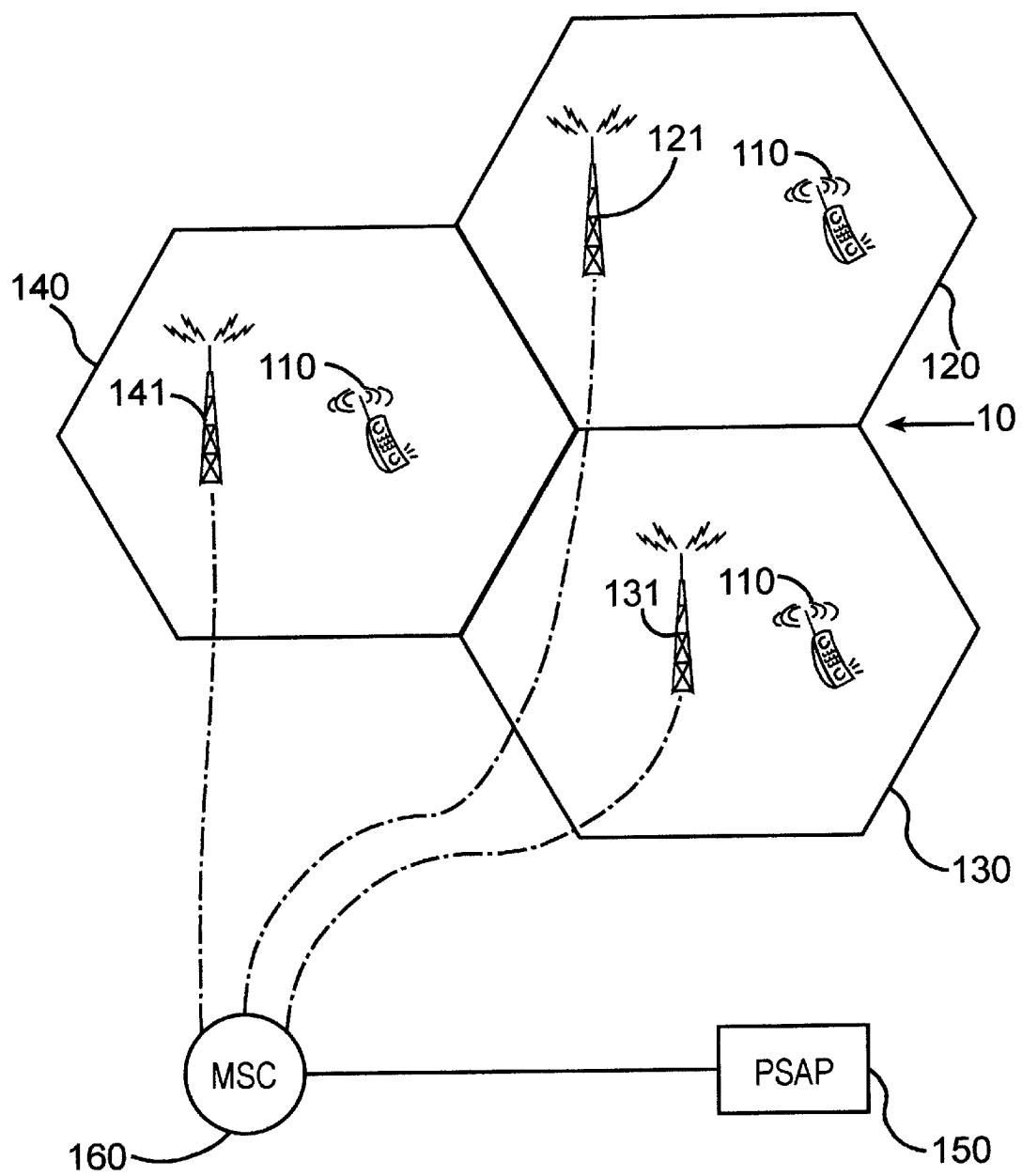
FIG. 1 is a schematic diagram showing a prior art wireless communication network having a plurality of cell sites within which a wireless device travels.
Figure 2:
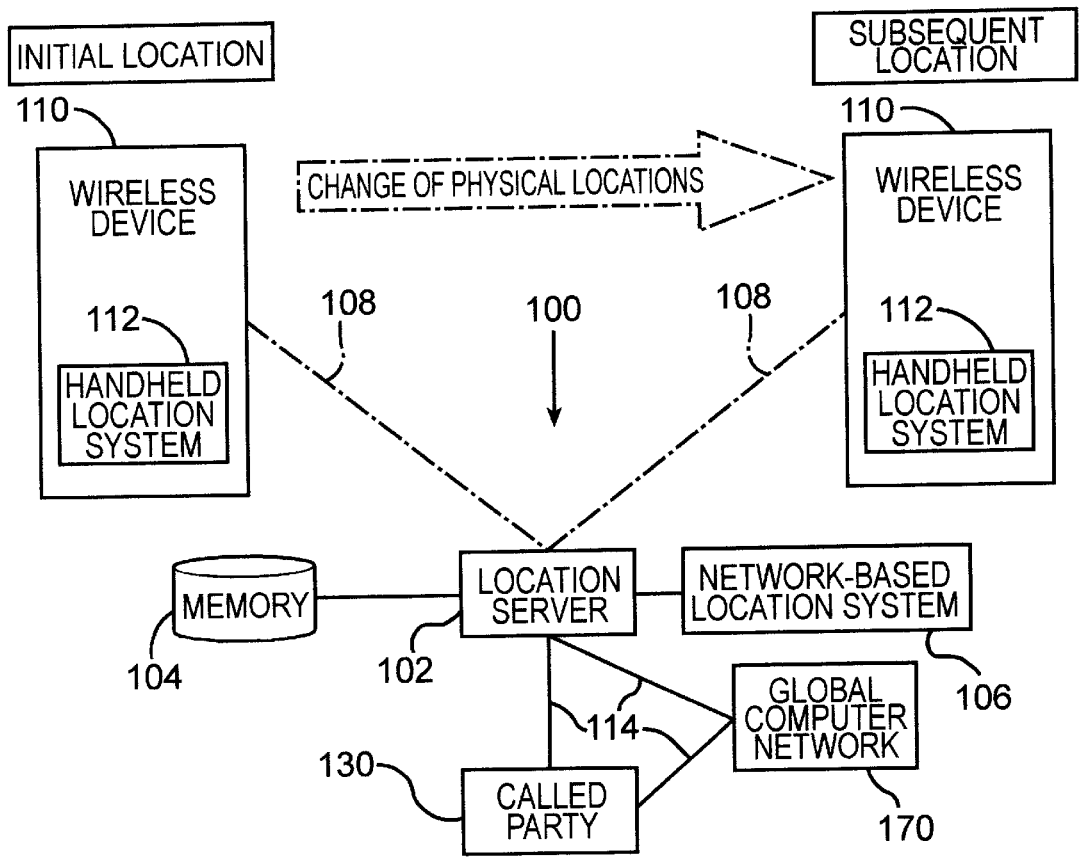
FIG. 2 is a schematic diagram showing the system architecture of a preferred embodiment of the present invention, and illustrating wireless device 110 moving from an initial location to a subsequent location.
Figure 3:
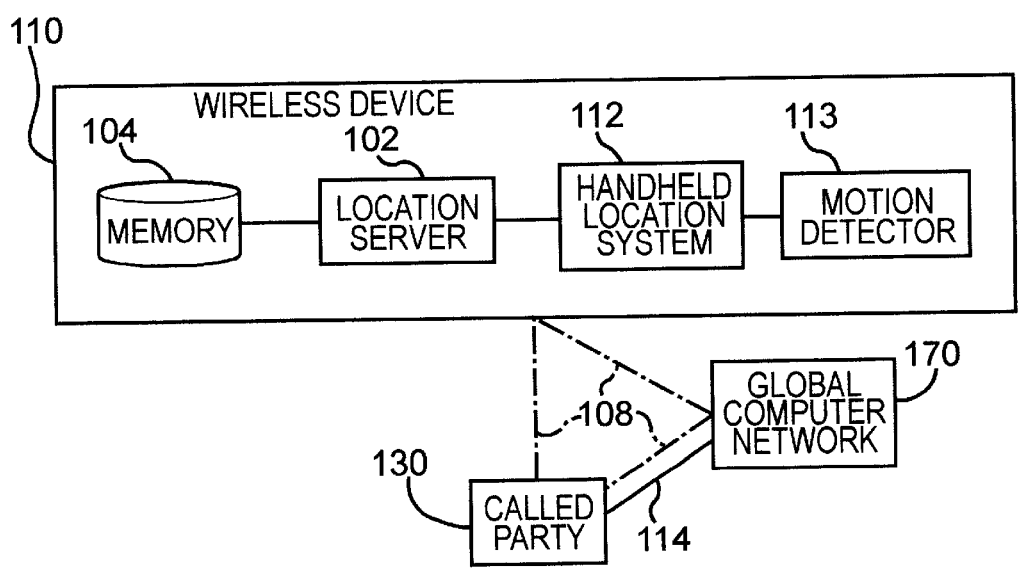
FIG. 3 is a schematic diagram showing an alternative system architecture of an embodiment of the present invention.

FIG. 2 is a schematic diagram showing a system architecture that can be used to implement a preferred embodiment the present invention, and illustrating wireless device 110 moving from an initial location to a subsequent location. FIG. 3 is a schematic diagram showing an alternative system architecture for an embodiment of the present invention. Wireless device 110 may be any apparatus that can establish a wireless communication session with called party 130 via wireless communication link 108. For example, wireless device 110 may be a wireless telephone, a handheld computer, an interactive pager, or a personal digital assistant. Preferably, wireless device 110 is a WAP-compatible thin client having a thin browser adapted to communicate with wireless communication network 100 and global computer network 170. An example of global computer network 170 is the Internet. Communication among location server 102, called party 130, and global computer network 170 may be via either wireless communication link 108 or wireline communication link 114, or both. The session may be a voice or a data session, or both. Furthermore, the session may use one of several technologies, including POTS and VoIP.

To track the location of wireless device 110, the system architecture can include one or both of network-based location system 106 and handheld location system 112. Network-based location system 106 may be a component of wireless communication network 100. Handheld location system 112 may be an integrated part of wireless device 110. One or both of network-based location system 106 and handheld location system 112 can generate location information pinpointing the location of wireless device 110. In preferred embodiments, both location systems 106 and 112 are compatible with the Geographic Information System (GIS) and the Global Positioning System (GPS). Handheld location system 112 is preferably a GPS receiver that is in wireless communication with a constellation of GPS satellites. In preferred embodiments, both location systems 106 and 112 can be used to provide redundancy, accuracy, and reliability. The location information may comprise point coordinates pinpointing the location of wireless device 110. The point coordinates can include an X component and a Y component of a coordinate system. In an exemplary embodiment of the present invention, the location information comprises a longitude and a latitude. For increased accuracy and granularity, the location information can further comprise an altitude. In preferred embodiments, the location information can pinpoint the location of wireless device 110 to within 125 meters, as required by the E911 mandate. Both location systems are preferably WAP compatible components.

In preferred embodiments, location server 102 is compatible to one or more of GIS, GPS, and WAP. Location server 102 can receive the location information from one or both of location systems 106 and 112. Location server 102 can also receive identity information of wireless device 110. The identity information may comprise, for example, a serial number of wireless device 110. The identity information may also be a mobile identification number of a wireless telephone. Location server 102 may be a network-based component, as shown in FIG. 2. In other embodiments, location server 102 may be a portable unit that is part of wireless device 110, as shown in FIG. 3. Therefore, wireless device 110 may comprise none, one, or both of the location server and the location system.

As discussed above, in preferred embodiments of the present invention, location server 102 and location systems 106 and 112 can be WAP compatible. WAP is an application environment and set of communication protocols for wireless devices designed to enable manufacturer-, vendor-, and technology-independent access to global computer network 170 and advanced wireless telephony services provided by wireless communication network 100. An example of global computer network 170 is the Internet. WAP provides wireless Internet access through digital cellular networks, giving network users a menu driven method for downloading information, such as flight schedules and bank account balances, to wireless devices from the Internet. WAP is described in WAP version 1.1, which is herein incorporated by reference in its entirety.

The system of the present invention can further comprise motion detector 113, which can be incorporated as part of wireless device 110. Motion detector 113 is in communication with handheld location system 112. Motion detector 113 can sense or detect the movement of wireless device 110. Motion detector 113 may trigger handheld location system 112 to generate location information when a motion is detected. Similarly, motion detector 113 may cause handheld location system 112 to cease generating location information when no motion is detected.

Although shown as a separate component in FIGS. 2 and 3, memory 104 could be an integrated component of location server 102. Memory 104 can store, for example, the location information, the identity information, and rules for generating and providing the location information. Some examples of the rules are as follows:

- generate initial location information at the time the wireless communication session is established between wireless device 110 and called party 130;
- generate subsequent location information continuously during the wireless communication session;
- generate subsequent location information at regular intervals during the wireless communication session;
- generate subsequent location information as long as a motion of wireless device 110 is detected;
- generate subsequent location information as long as a motion of wireless device 110 is not detected;
- provide the initial location information to called party 130 as soon as the initial location information is generated;
- provide the subsequent location information to called party 130 as soon as the subsequent location information is generated;
- provide the subsequent location information to called party 130 if the subsequent location information indicates that wireless device 110 has traveled a certain distance;
- provide the subsequent location information to called party 130 if the subsequent location information indicates that wireless device 110 is moving at a certain speed; and
- provide the subsequent location information to called party 130 upon request.

Figure 4:
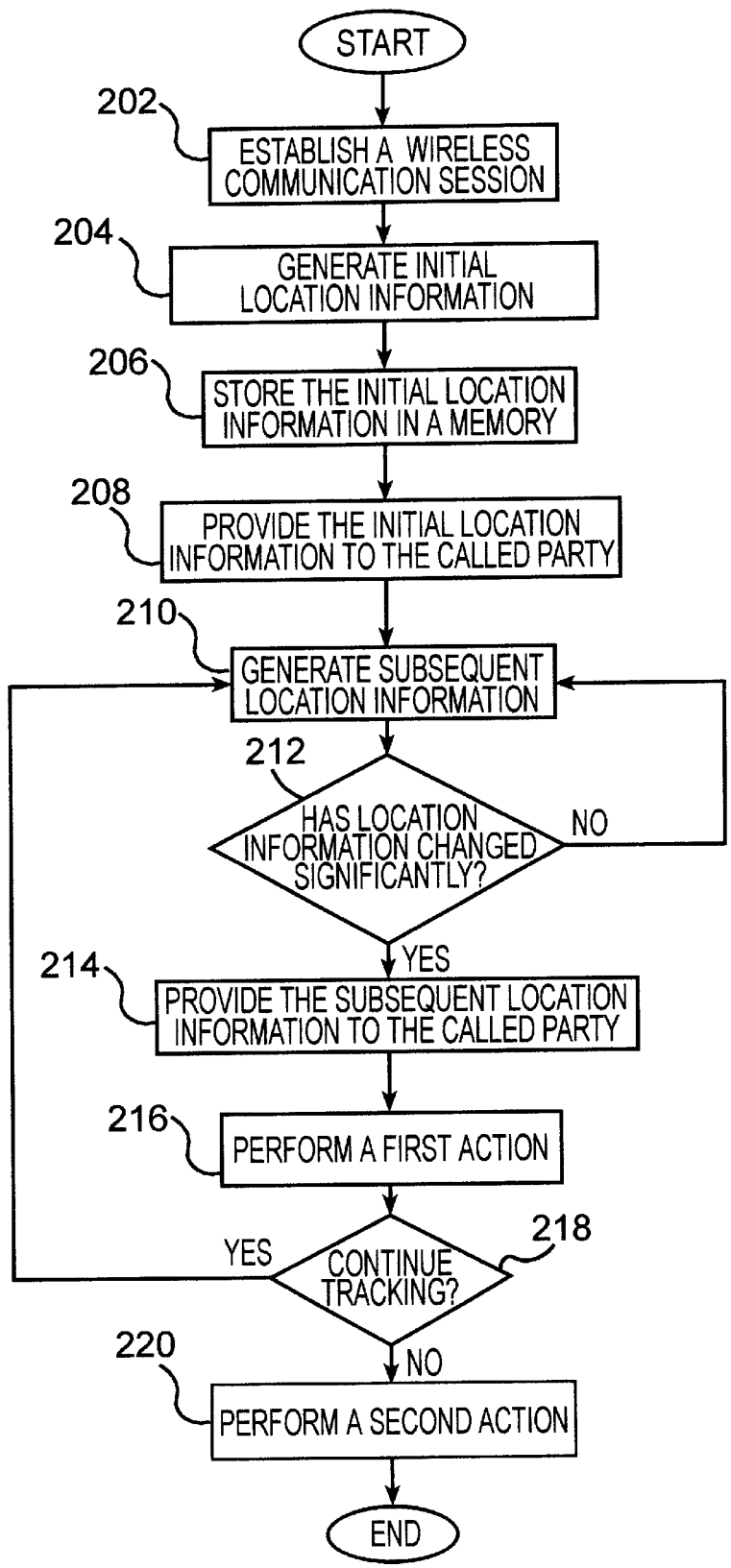
FIG. 4 is a flowchart illustrating general steps involved in using a preferred embodiment of the present invention.

FIG. 4 is a flowchart illustrating general steps involved in using a preferred embodiment of the present invention. In other specific embodiments, one or more of these general steps may be used. Furthermore, each of the general steps may include one or more sub-steps in the specific embodiments. Although these general steps and sub-steps are discussed herein sequentially, the steps may be implemented in any combination and in any logical order to accomplish a specific purpose. Furthermore, specific embodiments of the present invention may include additional steps not discussed herein.

In step 202, a wireless communication session can be established between wireless device 110 and called party 130. The session can be initiated by either party. The session may be a voice session; it may also be a data session. Furthermore, the session may be established using one of several technologies, including POTS and VoIP. In a preferred embodiment in which the dial string 911 is used to establish the wireless communication session, a PSAP may be called party 130.

In step 204, initial location information can be generated by a location system. The initial location information and any subsequent location information may be generated by handheld location system 112, by network-based location system 106, or by a combination of both location systems. In preferred embodiments, handheld location system 112 is a GPS receiver that can generate the initial location information using data received from a constellation of GPS satellites. Network-based location system 106 can generate the location information using triangulation across cell sites based on signal strength experienced by wireless device 110, or by other methods. The initial location information can pinpoint the location of wireless device 110 either at the time the wireless communication session is established, or at the time the initial location information is generated.

In step 206, the initial location information may be stored in memory 104. Memory 104 may be a database that is accessible by location server 102. In step 208, the initial location information can be provided to called party 130. The initial location information may be provided by wireless device 110 via wireless communication link 108. In preferred embodiments, the initial location information may be provided using a "push technology."

In step 210, subsequent location information can be generated. The subsequent location information may be generated based on one or more of the rules discussed above. For discussion purposes, the initial location information can pinpoint an initial location at time T1, and the subsequent location information can pinpoint a subsequent location at time T2. Numerous subsequent location information may be generated during a wireless communication session.

In step 212, location server 102 can compare two successive location information (e.g., the initial and first subsequent location information, or the first and second subsequent location information, and so on) to determine whether the change of location is significant or material. The significance or materiality depends on whether the subsequent location is sufficiently far apart from the initial location. For example, a change may be considered to be not material unless the change of location is more than 125 meters, which is the range of error under the E911 mandate. The distance may be shorter or longer than 125 meters depending on the precision desired. Another test for materiality may be based on the speed at which wireless device 110 is moving. For example, it could be considered a material change has taken place if wireless device 110 is moving at a speed greater than 60 miles per hour (the calculation can be made based on the distance traveled and the difference between time T1 and time T2). If the change is insignificant or immaterial, the process returns to step 210, and called party 130 may not be provided with the subsequent location information.

If in step 212 the change was considered significant or material, the process goes to step 214, in which called party 130 can be provided with the subsequent location information. The subsequent location information may be provided in the same manner the initial location information was provided.

In step 216, called party 130 may use one or more of the initial location information and the subsequent location information to perform a first action. The first action may involve the dispatch of a police officer to a location pinpointed by one of the location information. The first action may also comprise an inaction. The first action can be performed while the wireless communication remains active or in session.

In step 218, a determination can be made on whether additional subsequent location information should be generated during the wireless communication session. The process returns to step 210 if additional subsequent location information is desirable.

However, if in step 218 the decision was that no additional subsequent location information is needed, the process goes to step 220, in which a second action can be performed. The second action may also comprise an inaction. The second action may be performed during or after the wireless communication session. Examples of the second action include terminating the session, analyzing the initial location information and the subsequent location information received, and performing other actions or tasks tailored to specific purposes. In preferred embodiments, once the communication session is terminated, no additional location information would be generated.

In light of the above disclosure, there are a number of specific embodiments through which the present invention may be implemented. Set forth below are two specific preferred embodiments of the present invention.

Figure 5:
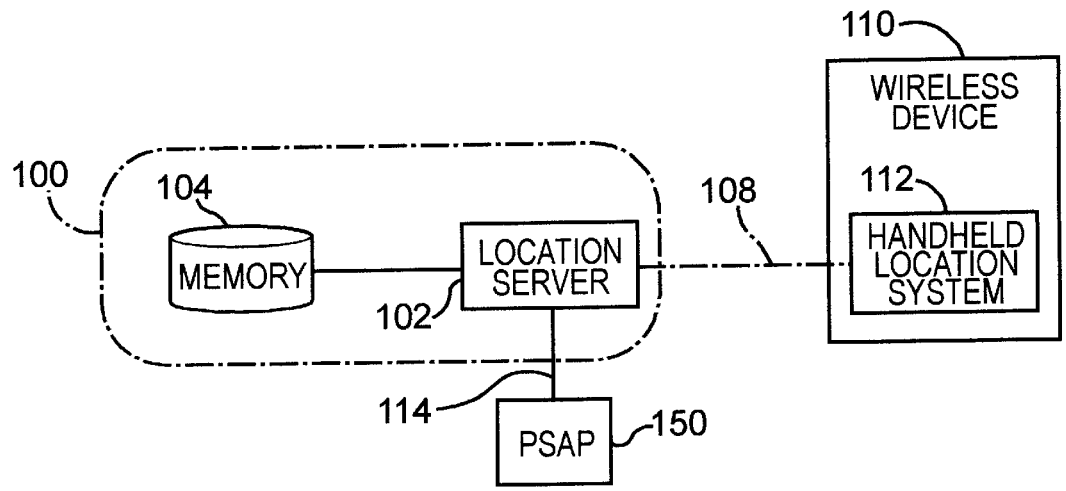
FIG. 5 is a schematic diagram showing the system architecture of a specific preferred embodiment of the present invention.
Figure 6:
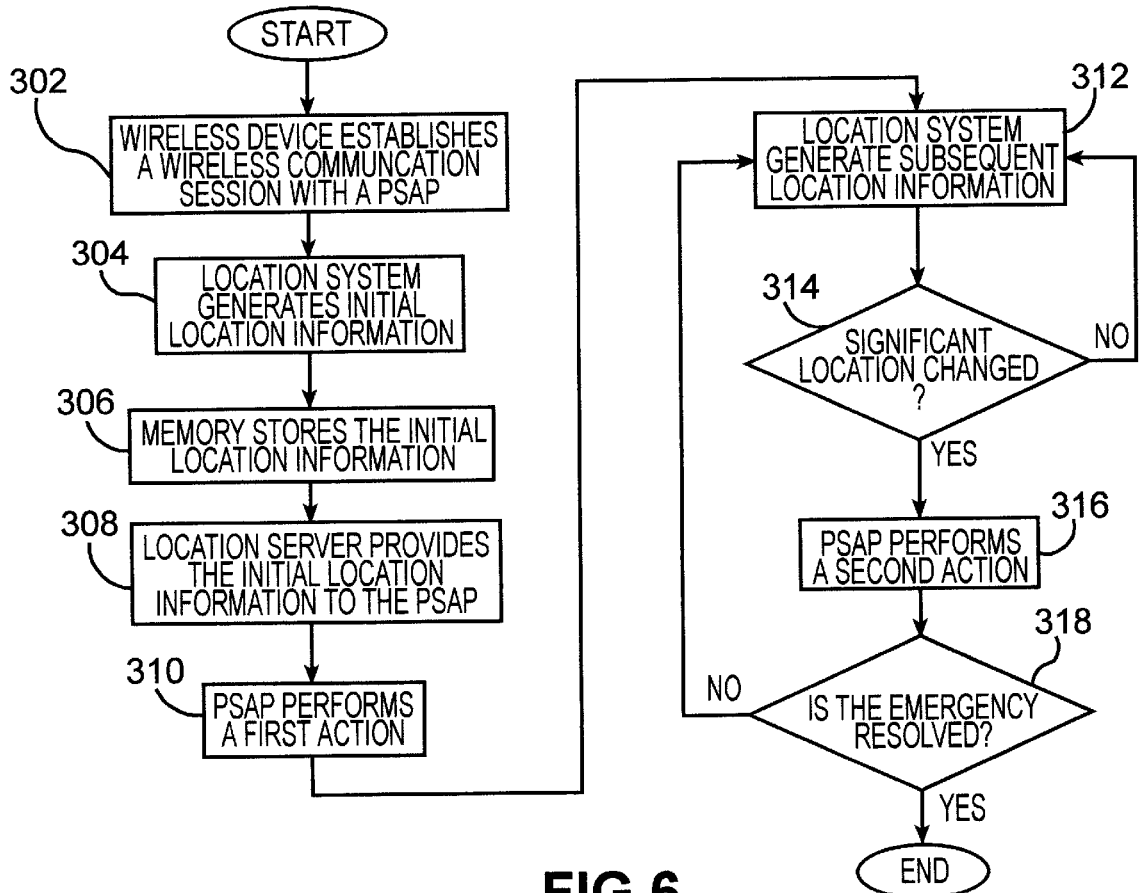
FIG. 6 is a flowchart illustrating the steps involved in using the specific preferred embodiment of the present invention shown in FIG. 5.

FIG. 5 is a schematic diagram showing the system architecture of a specific preferred embodiment of the present invention. In this embodiment, handheld location system 112 is part of wireless device 110. Location server 102 and memory 104 are network-based components of wireless communication network 100. PSAP 150 is the called party that is in communication with location server 102. Wireless device 110 is in wireless communication with location server 102 via wireless communication link 108. FIG. 6 is a flowchart illustrating the steps involved in using the specific preferred embodiment shown in FIG. 5.

In step 302, a caller can establish a communication session with PSAP 150 using wireless device 110. The caller may, for example, dial a number, such as 911, using wireless device 110 to establish a wireless communication session with PSAP 150. The wireless communication session can be a voice session using POTS technology. The session may also be a VoIP session. The caller, for discussion purposes in this embodiment, is a victim of a kidnapping scheme. The caller is being transported by a kidnapper in the trunk of a moving automobile. The caller informs PSAP 150 that he is being transported, but he does not know where he is, or where he is being transported to.

In step 304, initial location information is generated by the handheld location system 112. The initial location information can be generated as soon as the wireless communication session is established. The initial location information can pinpoint the location of wireless device 110 at the time the wireless communication session is established.

In step 306, the initial location information is provided to location server 102. The initial location information can then be stored in memory 104. In step 308, location server 102 can provide the initial location information to PSAP 150. Alternatively, PSAP 150 can retrieve the initial location information from memory 104. An operator at PSAP 150 then can see or hear point coordinates of the initial location that is pinpointed by the initial location information. The operator may also plot the initial location on a map.

In step 310, PSAP 150 can use the initial location information to perform a first action. For example, PSAP 150 may inform an emergency response team comprising police officers that the caller is at the initial location. In step 312, subsequent location information can be generated by location system 112. The subsequent location information may be generated continuously during the wireless communication session, or it may be generated at specific intervals, e.g., every two minutes. The subsequent location information can also be stored in memory 104 as well. Like the initial location information, the subsequent location information is retrievable by location server 102 and PSAP 150.

In step 314, a determination is made by location server 102 or by PSAP 150 on whether wireless device 110 has been moved to a subsequent location that is substantially different from the initial location. For example, location server 102 or PSAP 150 may consider a movement of a specific distance to be substantial or significant, as defined by rules stored in memory 104. In a specific example, the distance may be 125 meters or more. If the change detected is substantial or significant, the process goes to step 316; otherwise, the process returns to step 312.

In step 316, PSAP 150 can perform a second action. The second action may comprise informing the emergency response team about the significant change of location. The second action may comprise an inaction if PSAP 150 had been informed by the emergency response team that the automobile had been found and the police officers are following the automobile closely.

In step 318, if the emergency response team successfully resolves the emergency situation, e.g., the kidnapper had been caught, the process ends. Otherwise, the process returns to step 312 for as long as the wireless communication session remains active. PSAP 150 preferably has exclusive control over the wireless communication session. In other words, only PSAP 150 can terminate the session.

Figure 7:
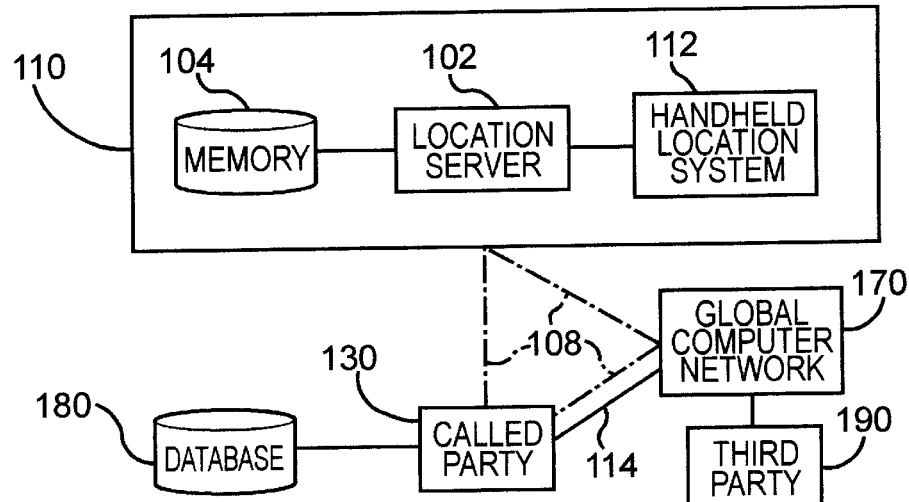
FIG. 7 is a schematic diagram showing the system architecture of another specific preferred embodiment of the present invention.
Figure 8:
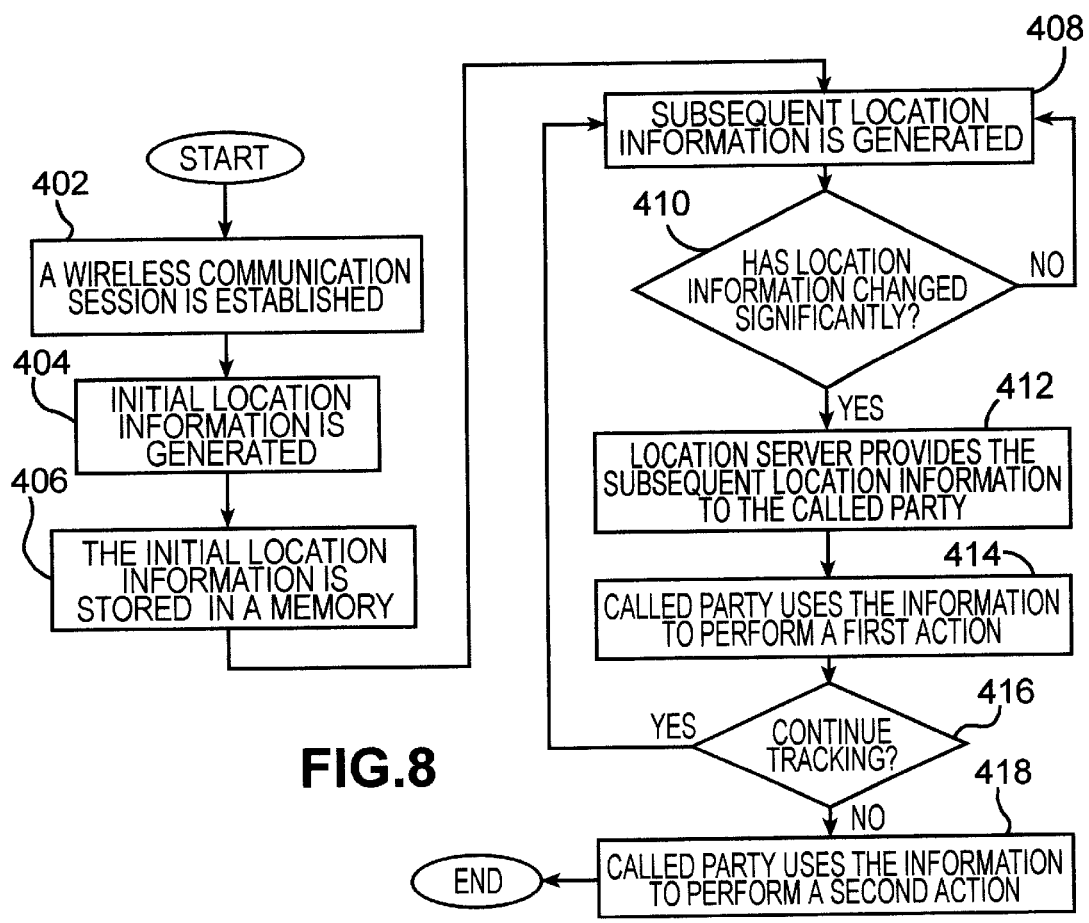
FIG. 8 is a flowchart illustrating the steps involved in using the specific preferred embodiment of the present invention shown in FIG. 7.

FIG. 7 is a schematic diagram showing the system architecture of another specific preferred embodiment of the present invention. In this embodiment, handheld location system 112, location server 102, and memory 104 are components of wireless device 110. Memory 104 can store, among other things, rules or instructions as to when location information should be generated by location system 112, and whether the location information should be provided to called party 130. Wireless device 110 is in communication with called party 130 and global computer network 170 via wireless communication links 108. Called party 130 has database 180 that can store, among other things, location information received from wireless device 110. FIG. 8 is a flowchart illustrating the steps involved in using the specific preferred embodiment shown in FIG. 7.

In step 402, a wireless communication session between called party 130 and wireless device 110 is established. The wireless communication session can be a data session. Called party 130 may be a news agency that tracks the progress of an expedition by a man who sails around the world by himself on a sail boat. Wireless device 110 is carried by the man.

In step 404, initial location information can be generated by location system 112 as soon as the wireless communication session is established. The initial location information pinpoints the location of wireless device 110 at the time the initial location information is generated. The initial location information can be provided to called party 130 via wireless communication link 108. The initial location information may also be provided to third party 190 via global computer network 170. Third party 190 may be any person interested in the expedition.

In step 406, the initial location information can be stored in memory 104 and database 180 by location server 102 and called party 130, respectively. In step 408, location system 112 can generate subsequent location information in accordance with the rules stored in memory 104. The subsequent location information can be provided to location server 102 and be stored in memory 104. The rules may comprise an instruction to generate the subsequent location information at regular intervals, e.g., every five hours.

In step 410, location server 102 can determine whether a significant change of locations has occurred based on two successive location information. If the change is significant, e.g., in the example of the man sailing around the world, 20 nautical miles or more has been traveled between two successive location information, the process goes to step 412; otherwise, it returns to step 408.

In step 412, location server 102 can provide the subsequent location information to called party 130, which in turn can store the subsequent location information in database 180. Third party 190 may retrieve the subsequent location information from global computer network 170. In step 414, called party 130 can use the location information to perform a first action, which is performed while the wireless communication session remains active. For example, called party 130 can use the subsequent location information to create a news segment to report the progress of the expedition. Another example of the determination made in step 410 may comprise whether the boat is sailing along an intended route. If the subsequent location information indicates that the boat has drifted away from the intended route, the second action may comprise an attempt to rescue the man.

In step 416, a determination can be made on whether continuing tracking of the location of wireless device 110 is warranted. For example, if the expedition has been completed successfully or otherwise aborted prematurely, then continued tracking would not be necessary. If additional tracking is desirable, however, the process returns to step 408. Otherwise, the process goes to step 418.

In step 418, called party 130 may use the location information to perform a second action. The second action may also be an inaction. In the example of the man sailing around the world, the second action may be, for example, an analysis of all location information received by called party 130 to create a documentary about the expedition. The second action can be performed after the wireless communication session is terminated.

Two specific examples of how the present invention may be implemented have been discussed above. Additional embodiments may be implemented. The additional embodiments may include, for example, the following applications:

A security guard carrying a wireless device of the present invention patrols a compound. The wireless device transmits location information continuously during the wireless communication session between the wireless device and the security guard's operation center. The operation center sends a back up team to the security guard if the location information indicates that the security guard stays motionless for a period of time.

A school bus buses students along a specific route. A wireless device of the present invention that is installed on the bus transmits location information during the wireless communication session between the wireless device and the school district's transportation department. The transportation department calls the police if the location information indicates that the school bus has deviated from the intended route.

A trucking company equips a wireless device of the present invention on each of its truck. During the wireless communication session, when location information indicates that a truck is moving at a speed above certain threshold, e.g., faster than the legal speed limit, a driving record of the truck is created at the trucking company's office. The record comprises the speed of the truck at the time the subsequent location is generated, the location at the time of the speed, and the identity of the driver.

The foregoing disclosure of embodiments and specific examples of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A system for tracking movement of a wireless device, the system comprising:

a location system in the wireless device;

a location server in communication with the location system, the location server is in the wireless device, a motion detector in communication with the location server, the motion detector is in the wireless device; and a memory in communication with the location system and the location server, the memory is in the wireless device, wherein the memory comprises rules related to motion, or lack thereof, of the wireless device as detected by the motion detector, generation of location information by the location system, and provision of the location information to a called party by the location server;

wherein when a wireless communication session is established between the wireless device and the called party, the location system generates initial location information in accordance with the rules;

wherein the location system generates subsequent location information during the wireless communication session in accordance with the rules;

wherein the initial and subsequent location information are provided to the called party in accordance with the rules;

wherein one or both of the initial and subsequent location information can be used by the called party to perform an action; and wherein the location system ceases to generate location information when the wireless communication session is terminated.

2. The system of claim 1, wherein the action comprises providing one or both of initial and subsequent location information to a third party.

3. The system of claim 1, wherein the action comprises an inaction.

4. The system of claim 1, wherein the rules further comprise an instruction to generate the subsequent location information continuously.

5. The system of claim 1, wherein the rules further comprise an instruction to generate the subsequent location information at regular intervals.

6. The system of claim 1, wherein the rules further comprise an instruction to generate the subsequent location information when the motion detector detects no motion.

7. The system of claim 1, wherein the rules further comprise an instruction to generate the subsequent location information when the motion detector detects a motion.

8. The system of claim 1, wherein the rules further comprise an instruction to provide the subsequent location information to the called party if the wireless device had traveled a distance.

9. The system of claim 1, wherein the rules further comprise an instruction to provide the subsequent location information to the called party if the wireless device is moving at a speed.

10. A method for tracking movement of a wireless device, the method comprising:

storing rules in a memory of the wireless device, the rules relate to generation and provision of location information generated by a location system in the wireless device based at least in part on detection of motion, or lack thereof, of the wireless device as detected by a motion detector in the wireless device;

establishing a wireless communication session between the wireless device and a called party;

generating, by the location system, initial location information that pinpoints the wireless device's location;

providing the initial location information to the called party;

detecting motion of the wireless device by the motion detector in the wireless device;

generating, by the location system, subsequent location information in accordance with the rules; and providing the subsequent location information to the called party in accordance with the rules.

11. The method of claim 10, further comprising using the subsequent location information to perform an action.

12. The method of claim 11, wherein the action comprises providing the location information to a third party.

13. The method of claim 11, wherein the action comprises an inaction.

14. The method of claim 10, wherein the rules further comprise an instruction to generate the subsequent location information continuously.

15. The method of claim 10, wherein the rules further comprise an instruction to generate the subsequent location information at regular intervals.

16. The method of claim 10, wherein the rules further comprise an instruction to generate the subsequent location information when the motion detector in the wireless device determines that the wireless device is not in motion.

17. The method of claim 10, wherein the rules further comprise an instruction to generate the subsequent location information when the motion detector in the wireless device determines that the wireless device is in motion.

18. The method of claim 10, further comprising calculating a distance traveled by the wireless device based on the location information.

19. The method of claim 10, further comprising calculating a speed at which the wireless device is traveling based on the location information.

20. A system for tracking movement of a wireless device during a wireless communication session between the wireless device and a called party, the system comprising:

a memory comprises rules related to generation and provision of location information, wherein the rules include an instruction to generate and provide the location information when the wireless device is determine to do one or more of the following:

beginning to move, staying motionless, traveling a certain distance, moving at a certain speed, and deviating from an intended route;

a location system in communication with the memory, the location system generates the location information in accordance with the rules; and a location server in communication with the memory and the location system, the location server provides the location information to the called party in accordance with the rules, wherein the location system generates the location information in accordance with the rules, wherein the the location information pinpoints the wireless device's location at the time the the location information is generated.

21. The system of claim 20, wherein the wireless communication session is a voice session.

22. The system of claim 20, wherein the wireless communication session is a data session.

23. The system of claim 20, wherein one or all of the memory, the location system, and the location server are in the wireless device.

24. The system of claim 20, wherein the wireless communication session can be terminated by the called party only.

25. The system of claim 20, wherein the called party is a public safety answering point.

26. The system of claim 20, wherein the location information is provided to the called party using a push technology.

27. A method for tracking movement of a wireless device during a wireless communication session between the wireless device and a called party, the method comprising:

establishing the wireless communication session;

generating initial location information pinpointing the wireless device's location at the time the wireless communication session is established;

providing the initial location information to the called party;

generating subsequent location information in accordance with a rule, wherein the rule includes an instruction to generate and provide the location information when the wireless device is determine to do one or more of the following: beginning to move, staying motionless, traveling a certain distance, moving at a certain speed, and deviating from an intended route, wherein the subsequent location information pinpoints the wireless device's location at the time the subsequent location information is generated; and providing the subsequent location information to the called party in accordance with the rule.

28. The method of claim 27, further comprising the step of using the location information to perform an action.

29. The method of claim 27, wherein the wireless communication session comprises one of a voice session and a data session.

30. The method of claim 27, wherein the rule comprises a determination of a distance traveled.

31. The method of claim 27, further comprising the step of providing the location information to a third party.

32. The method of claim 27, wherein the location information is provided via a global computer network.

33. The method of claim 27, wherein the location information is provided using a push technology.

34. The method of claim 27, wherein the action is performed by the called party.

35. The method of claim 27, wherein the action is performed by the third party.

36. The method of claim 27, wherein the action is performed during the wireless communication session.

37. The method of claim 27, wherein the action is performed after the wireless communication session is terminated.

* * * * *